United States Patent
Wang et al.

(10) Patent No.: US 10,444,337 B2
(45) Date of Patent: Oct. 15, 2019

(54) METHODS AND APPARATUS UTILIZING TIME DIVISION ACCESS OF MULTIPLE RADAR MODULES IN LIVING OBJECT DETECTION FOR WIRELESS POWER TRANSFER APPLICATIONS

(71) Applicant: WiTricity Corporation, Watertown, MA (US)

(72) Inventors: Qi Wang, Stuttgart (DE); Joshua Reuben Lee, Munich (DE); Michael Hutterer, Dachau (DE)

(73) Assignee: WiTricity Corporation, Watertown, MA (US)

( * ) Notice: Subject to any disclaimer, the term of this patent is extended or adjusted under 35 U.S.C. 154(b) by 361 days.

(21) Appl. No.: 14/935,098

(22) Filed: Nov. 6, 2015

(65) Prior Publication Data

US 2016/0341822 A1 Nov. 24, 2016

Related U.S. Application Data

(60) Provisional application No. 62/165,465, filed on May 22, 2015.

(51) Int. Cl.
*G01S 13/04* (2006.01)
*G01S 13/87* (2006.01)

(52) U.S. Cl.
CPC ............. *G01S 13/04* (2013.01); *G01S 13/87* (2013.01)

(58) Field of Classification Search
CPC ....................................................... G01S 13/04
(Continued)

(56) References Cited

U.S. PATENT DOCUMENTS

| 6,268,803 B1 | 7/2001 | Gunderson et al. |
| 7,548,182 B2 * | 6/2009 | Ichiyanagi ............. G01S 7/032 342/27 |

(Continued)

FOREIGN PATENT DOCUMENTS

| EP | 0611969 A1 | 8/1994 |
| EP | 1813963 A2 | 8/2007 |

OTHER PUBLICATIONS

International Search Report and Written Opinion—PCT/US2016/030041—ISA/EPO—dated Jul. 13, 2016.
(Continued)

*Primary Examiner* — Marcus E Windrich
(74) *Attorney, Agent, or Firm* — Knobbe Martens Olson & Bear LLP

(57) ABSTRACT

Methods and apparatus utilizing time division access of multiple radar transceivers in living object detection for wireless power transfer applications are provided. In one aspect, an apparatus for detecting an object in a detection area of a wireless power transfer system is provided. The apparatus comprises a plurality of radar transceivers. The apparatus comprises a processor configured to group the plurality of radar transceivers into pairs of radar transceivers. The processor is configured to instruct each of the pairs of radar transceivers to transmit radar signals during a corresponding time slot of a plurality of time slots. The processor is configured to instruct each of the pairs of radar transceivers to receive the radar signals during the corresponding time slot of the plurality of time slots. The processor is configured to detect the object in the detection area based on at least some of the radar signals received by each of the pairs of radar transceivers.

23 Claims, 6 Drawing Sheets

(58) Field of Classification Search
USPC .................................................. 342/27–28
See application file for complete search history.

(56) References Cited

U.S. PATENT DOCUMENTS

| | | | | |
|---|---|---|---|---|
| 7,592,944 | B2 | 9/2009 | Fullerton et al. | |
| 8,217,827 | B2* | 7/2012 | Hayward | G01S 13/003 |
| | | | | 342/104 |
| 8,482,452 | B2 | 7/2013 | Chambers et al. | |
| 8,542,109 | B2* | 9/2013 | Butler | G08B 13/2494 |
| | | | | 340/522 |
| 8,943,352 | B1* | 1/2015 | Warneke | G06F 1/3234 |
| | | | | 713/500 |
| 9,024,483 | B2 | 5/2015 | Wechlin et al. | |
| 2003/0222778 | A1* | 12/2003 | Piesinger | G01S 7/415 |
| | | | | 340/541 |
| 2008/0165046 | A1* | 7/2008 | Fullerton | G01S 7/003 |
| | | | | 342/21 |
| 2010/0234044 | A1* | 9/2010 | Lohbihler | G01S 5/02 |
| | | | | 455/456.1 |
| 2010/0277121 | A1* | 11/2010 | Hall | B60L 53/60 |
| | | | | 320/108 |
| 2012/0112953 | A1* | 5/2012 | Grau Besoli | G01S 7/03 |
| | | | | 342/146 |
| 2012/0146844 | A1* | 6/2012 | Stirling-Gallacher | G01S 13/34 |
| | | | | 342/189 |
| 2012/0187757 | A1* | 7/2012 | Wechlin | B60L 11/182 |
| | | | | 307/9.1 |
| 2012/0249356 | A1* | 10/2012 | Shope | G01S 13/04 |
| | | | | 342/22 |
| 2013/0176161 | A1* | 7/2013 | Derham | G01S 7/36 |
| | | | | 342/27 |
| 2014/0021908 | A1* | 1/2014 | McCool | B60L 11/182 |
| | | | | 320/108 |
| 2014/0217966 | A1* | 8/2014 | Schneider | H02J 7/025 |
| | | | | 320/108 |
| 2014/0253368 | A1* | 9/2014 | Holder | G01S 13/003 |
| | | | | 342/146 |
| 2014/0333256 | A1 | 11/2014 | Widmer et al. | |

OTHER PUBLICATIONS

European Office Action dated May 23, 2019 in corresponding EP Application No. 16721048.3 in 6 pages.

\* cited by examiner

METHODS AND APPARATUS UTILIZING TIME DIVISION ACCESS OF MULTIPLE RADAR MODULES IN LIVING OBJECT DETECTION FOR WIRELESS POWER TRANSFER APPLICATIONS

CLAIM OF PRIORITY UNDER 35 U.S.C. § 119

The present application for patent claims priority to Provisional Application No. 62/165,465 entitled "METHODS AND APPARATUS UTILIZING TIME DIVISION ACCESS OF MULTIPLE RADAR MODULES LIVING OBJECT DETECTION FOR WIRELESS POWER TRANSFER APPLICATIONS" filed May 22, 2015, and assigned to the assignee hereof. Provisional Application No. 62/165,465 is hereby expressly incorporated by reference herein.

FIELD

The present disclosure relates generally to wireless power transfer, and more specifically to methods and apparatuses utilizing time division access of multiple radar transceivers in living object detection for wireless power transfer applications.

BACKGROUND

Inductive power transfer to electrically chargeable vehicles at power levels of several kilowatts in both domestic and public parking zones may require special protective measures for safety of persons and equipment in proximity. Such measures may include detection of moving objects in the critical space of an inductive power transfer system. This may be particularly true for systems where the critical space (where electromagnetic field levels exceed certain critical levels) is open and accessible. Such measures may also include detection of living objects (e.g., humans, extremities of humans, or animals) to protect them from exposure to such strong electromagnetic fields.

However, multiple antenna detection systems may have limited calculating capability and limited interference tolerance. As such, methods and apparatuses utilizing time division access of multiple radar transceivers in living object detection for wireless power transfer applications are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Some implementations provide an apparatus for detecting an object in a detection area of a wireless power transfer system. The apparatus comprises a plurality of radar transceivers. The apparatus comprises a processor configured to group the plurality of radar transceivers into pairs of radar transceivers. The processor is configured to instruct each of the pairs of radar transceivers to transmit radar signals during a corresponding time slot of a plurality of time slots. The processor is configured to instruct each of the pairs of radar transceivers to receive the radar signals during the corresponding time slot of the plurality of time slots. The processor is configured to detect the object in the detection area based on at least some of the radar signals received by each of the pairs of radar transceivers.

Some other implementations provide method for detecting an object in a detection area of a wireless power transfer system. The method comprises grouping a plurality of radar transceivers into pairs of radar transceivers. The method comprises, for each of the pairs of radar transceivers, transmitting radar signals during a corresponding time slot and receiving the radar signals during the corresponding time slot. The method comprises detecting the object in the detection area based on at least some of the radar signals received by each of the pairs of radar transceivers.

Yet other implementations provide a non-transitory computer-readable medium comprising code that, when executed, causes an apparatus for detecting an object in a detection area of a wireless power transfer system to group a plurality of radar transceivers into pairs of radar transceivers. The code, when executed, further causes the apparatus to, for each of the pairs of radar transceivers, transmit radar signals during a corresponding time slot and receive the radar signals during the corresponding time slot. The code, when executed, further causes the apparatus to detect the object in the detection area based on at least some of the radar signals received by each of the pairs of radar transceivers.

Yet other implementations provide an apparatus for detecting an object in a detection area of a wireless power transfer system. The apparatus comprises a plurality of means for transmitting and receiving radar signals. The apparatus comprises means for grouping the plurality of means for transmitting and receiving radar signals into pairs. The apparatus comprises means for instructing each of the pairs to transmit radar signals during a corresponding time slot of a plurality of time slots. The apparatus comprises means for instructing each of the pairs to receive the radar signals during the corresponding time slot of the plurality of time slots. The apparatus comprises means for detecting the object in the detection area based on at least some of the radar signals received by each of the pairs.

DETAILED DESCRIPTION

The detailed description set forth below in connection with the appended drawings is intended as a description of implementations and is not intended to represent the only implementations. The term "exemplary" used throughout this description means "serving as an example, instance, or illustration," and should not necessarily be construed as preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
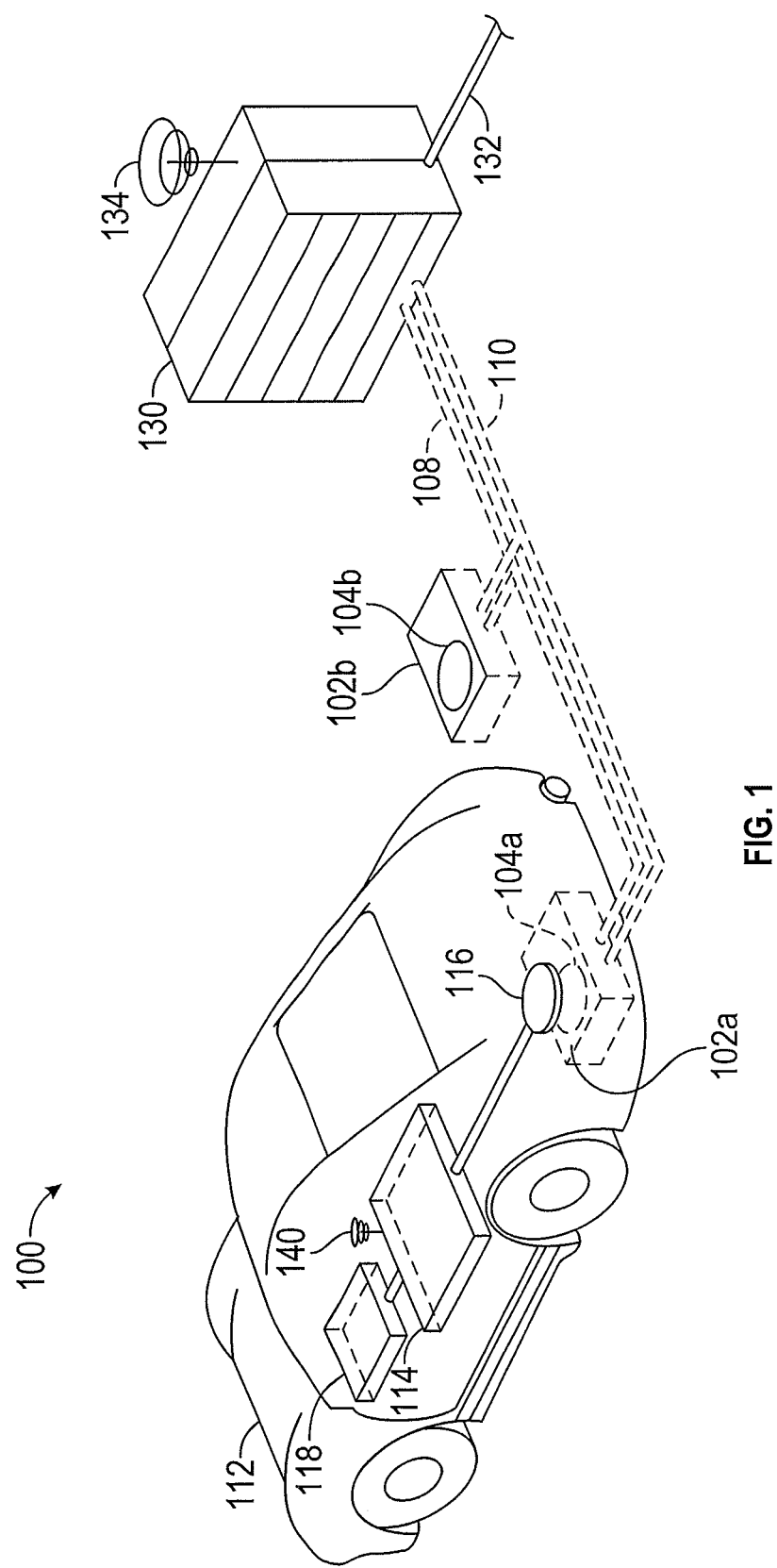
FIG. 1 illustrates a wireless power transfer system for charging an electric vehicle, in accordance with some implementations.

FIG. 1 is a diagram of a wireless power transfer system 100 for charging an electric vehicle, in accordance with some implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\frac{1}{2\pi}$ of a wavelength of the frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
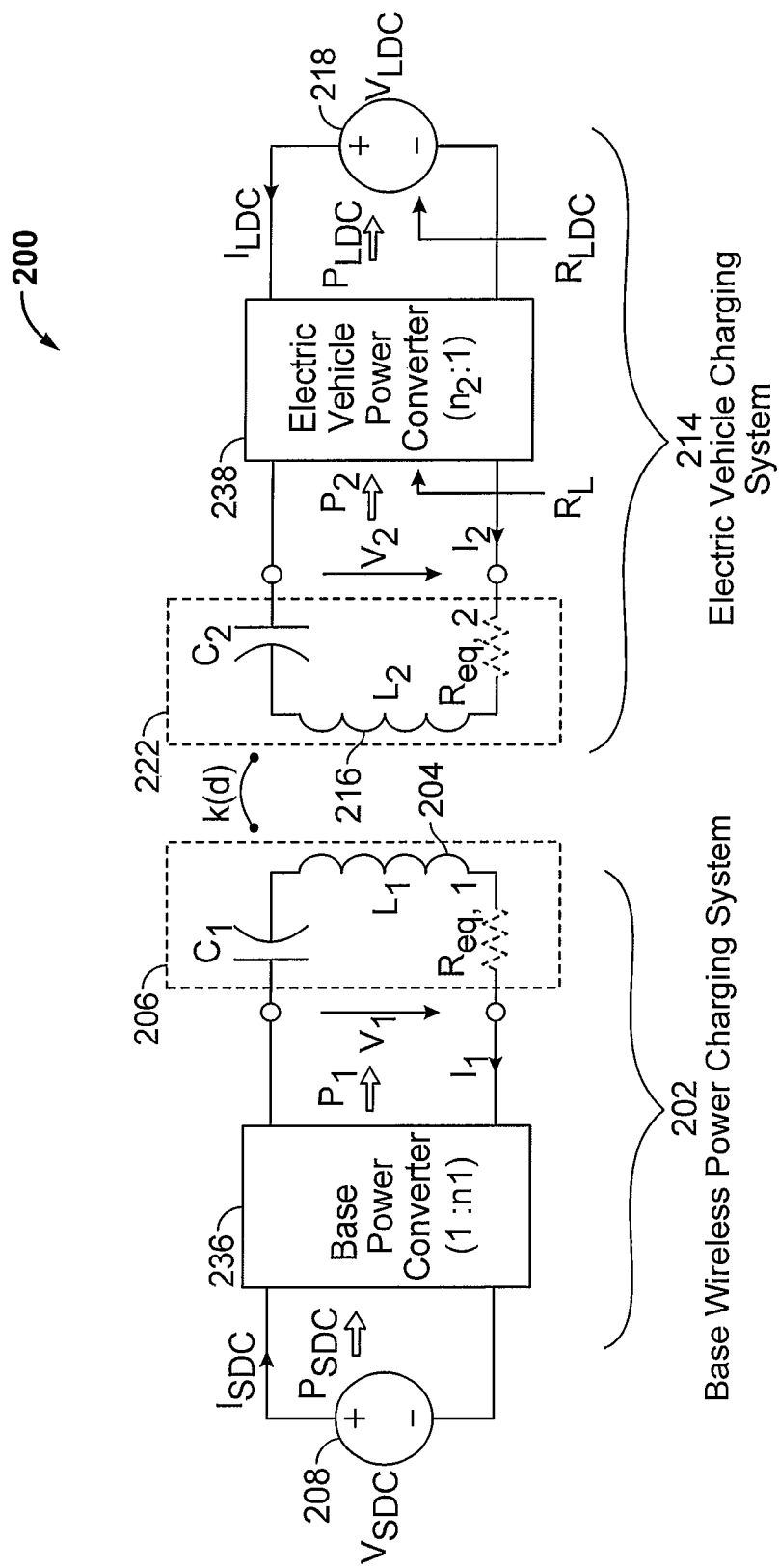
FIG. 2 is a schematic diagram of core components of a wireless power transfer system similar to that previously discussed in connection with FIG. 1, in accordance with some implementations.

FIG. 2 is a schematic diagram of core components of a wireless power transfer system 200 similar to that previously discussed in connection with FIG. 1, in accordance with some implementations. As shown in FIG. 2, the wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation "d". Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not shown) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into space. When in the near-field, a coupling mode may be established between the transmit coupler and the receive coupler. The space around the couplers where this near-field coupling may occur is referred to herein as a "near-field coupling mode region".

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
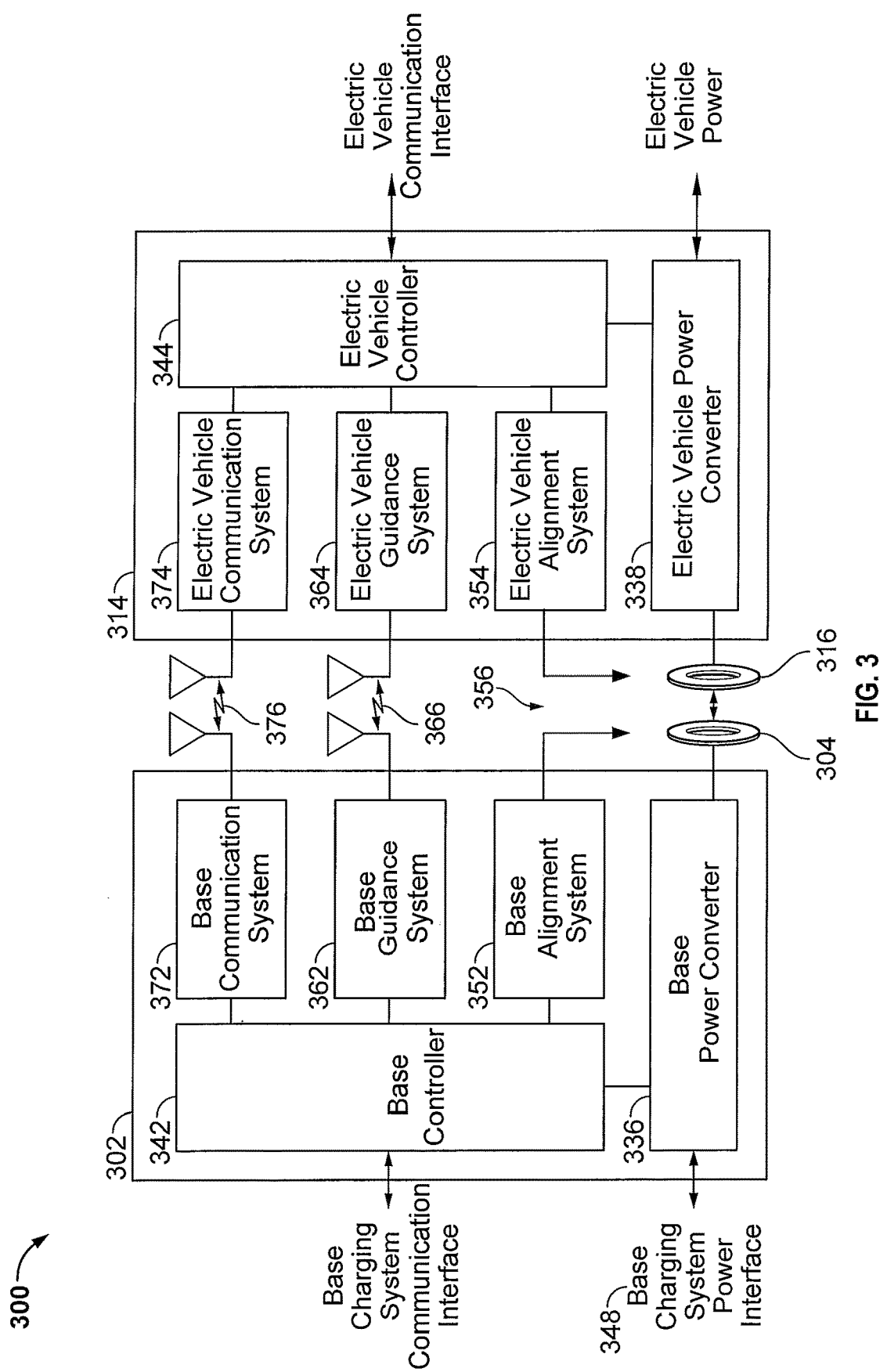
FIG. 3 is a functional block diagram showing core and ancillary components of the wireless power transfer system of FIG. 1.

FIG. 3 is a functional block diagram showing components of wireless power transfer system 300, which may be employed in wireless power transfer system 100 of FIG. 1 and/or that the wireless power transfer system 200 of FIG. 2 may be a part. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or transceivers for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 302, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detecting the presence of animals or children approaching the base and electric vehicle couplers 304, 316 beyond a safety radius, for detecting metal objects located near or in proximity of the base or electric vehicle coupler (304, 316) that may be heated up (induction heating), and for detecting hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

Figure 4:
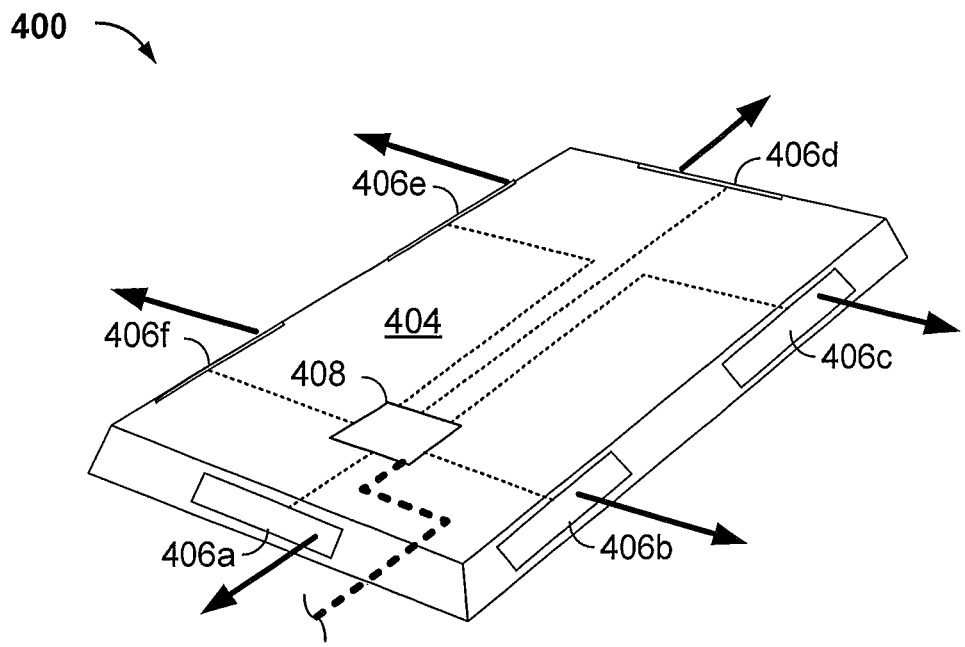
FIG. 4 is a schematic view of a living or moving object detection system integrated into a base pad of a wireless power transmitter, in accordance with some implementations.

Implementations described herein are directed to automatically detecting living and/or moving objects that may be located in a detection area around the inductive power transfer (IPT) base pad. FIG. 4 is a schematic view 400 of a living or moving object detection system integrated into a base pad 404 of a wireless power transmitter, in accordance with some implementations. As shown in FIG. 4, the base pad 404 may additionally include a plurality of radar transceivers 406a, 406b, 406c, 406d, 406e, and 406f (hereinafter collectively 406a-406f) each integrated into or mounted onto a side of the base pad 404. In some implementations, each radar transceiver, e.g., 406a may be configured to operate independently of the other radar transceivers, e.g., 406b-406f such that signals generated by the other radar transceivers, e.g., 406b-406f do not interfere with the operation of a particular radar transceiver, e.g., 406a. Because the radar transceivers 406a-406f are mounted on the sides of the base pad 404, living object protection (LOP) coverage on all sides or along an entire perimeter of the base pad 404 may be provided. In some implementations, the printed circuit boards (PCBs) of each of the radar transceivers 406a-406f may be integrated substantially vertically or at a slightly tilted angle from vertical (e.g., substantially perpendicular to the plane of the surface on which the base pad 404 is located). This arrangement may allow for integrating the radar transceiver without enlarging the dimensions of the base pad 404. In some other implementations, the radar transceivers 406a-406f may be integrated just below a top surface of the base pad 404 such that the base pad 404 may be flush mounted into a surface. In some other implementations, the radar transceivers 406a-406f may be installed on a vehicle as either a vehicle-pad-integrated system or as a discrete system.

As shown in FIG. 4, the base pad 404 may additionally include a processor 408 connected to each of the radar transceivers 406a-406f, as depicted by the thin dashed lines. The processor 408 may be configured to receive radar data from the radar transceivers 406a-406f. The processor 408 may utilize raw radar data from one or more of the radar transceivers 406a-406f in isolation (e.g., considering raw radar data from only one radar transceiver, e.g., 406a) or in combination (e.g., considering raw radar data from multiple radar transceivers 406a-406f in some aggregate fashion), to determine a presence of a moving or living object within a detection region, area or zone. Accordingly, the processor 408 and the plurality of radar transceivers 406a-406f may provide a "virtual electronic fence" around the base pad 404 for detecting any living or moving object in the detection region. In some implementations, the processor 408 may be configured to provide raw or processed radar data to the rest of the wireless electric vehicle charging (WEVC) system (see FIGS. 1-3) and receive status information or other data from the WEVC system. For such purposes, the processor 408 may be in communication with other portions of the WEVC system via a communications link, depicted by the heavy dotted line, at least to communicate an object detection trigger to the WEVC system for shutting down charging or for reducing an amount of power that is wirelessly transmitted by the base pad 404.

Figure 5:
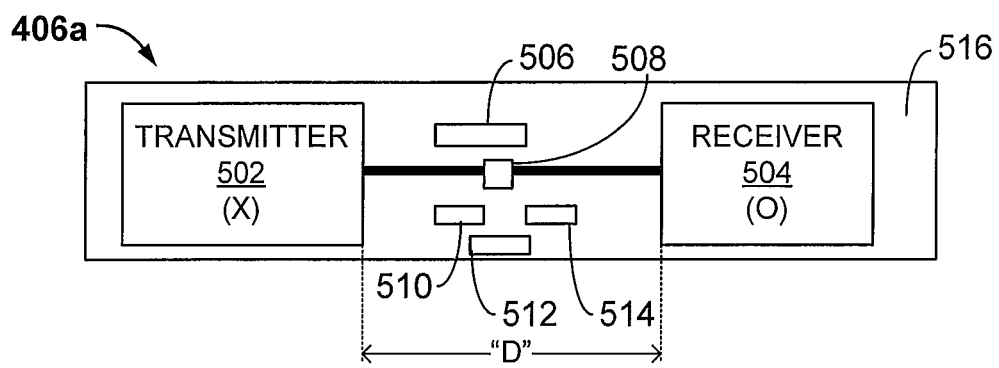
FIG. 5 is a functional block diagram of a radar transceiver as shown in FIG. 4, in accordance with some implementations.

The radar transceivers 406a-406f will now be discussed in more detail in connection with FIG. 5, using the radar transceiver 406a as a representative example of each of the plurality of radar transceivers 406a-406f. FIG. 5 is a functional block diagram of the radar transceiver 406a as shown in FIG. 4, in accordance with some implementations. The radar transceiver 406a may comprise a printed circuit board (PCB) 516. In some implementations, the PCB 516 may have a form factor of approximately 25 mm wide by 120 mm long, where the length may depend at least in part on a separation distance "D" between a transmitter 502 and a receiver 504 disposed on the PCB 516. However, the present application is not so limited and any dimensions may be utilized in accordance with a particular implementation. The separation distance "D" of the transmitter 502 from the receiver 504 may be based on a targeted or desired radar range and a desired or targeted width of the detection area (e.g., a desired detection area). For example, greater separation distance "D" leads to a wider detection area, but tends to shorten the usable range (e.g., the length of the detection area extending away from the radar transceiver). However, the overall behavior and performance of the radar transceiver 406a may depend on the type and characteristics of the transmitter 502 and the receiver 504. In some other implementations, a single transmitter/receiver may be contemplated at the expense of system sensitivity and potentially having to utilize a directional coupler circuit on the PCB 516.

The transmitter 502 and the receiver 504 may comprise ultra wide band (UWB) radar antennas operating in a frequency band of 1-10 GHz, although any type of UWB radar antenna operating in any associated frequency band (e.g., the 24 GHz ISM band, the 60 GHz ISM band, or the 77 GHz automotive band) may also be contemplated. In some implementations, the transmitter 502 and the receiver 504 may be configured to have omnidirectional transmit and receive patterns in the plane of operation.

The radar transceiver 406a may additionally comprise a processor 506, a UWB radar chip 508, interface circuitry 510, a connector 512, and a local power supply 514. The interface circuitry 510 may be configured to provide processing related to interfacing the radar transceiver 406a with the processor 408 of FIG. 4, for example. The UWB radar chip 508 may be configured to provide processing of raw radar data received from the receiver 504 or for transfer to the transmitter 502. The local power supply 514 may be configured to provide power to any of the chips or circuitry of the radar transceiver 406a. The connector 512 may be configured to provide the raw radar data from the radar transceiver 406a to the processor 408 previously described in connection with FIG. 4.

The radar transceiver 406a may additionally comprise the processor 506 configured to perform some level of local processing of raw radar data to be transmitted or that has been received by the transmitter 502 or the receiver 504, respectively. However, in at least some implementations, the processor 408 previously described in FIG. 4 may perform substantially all processing of the raw radar data received from the radar transceiver 406a.

The radar transceiver 406a may be configured to transmit radar signals via the transmitter 502, receive reflected radar signals via the receiver 504 (or via a receiver 504 of another radar transceiver 406b-406f), and provide raw radar data to at least one of the processor 506 of FIG. 5 and the processor 408 of FIG. 4. Ultimately, the processor 408 may be configured to determine, calculate, detect or provide information associated with an object detected in a detection area including but not limited to: a distance, a velocity, a direction to, or a size of the detected object. Upon accurate detection of an object, power to the base pad 404 may be discontinued or reduced to a lower level.

In practice, a higher frame rate (e.g., more transmissions per second from the plurality of radar transceivers 406a-406f) increases detection performance of the living or moving object detection system previously described in connection with FIGS. 4 and 5. However, increasing the frame rate requires an increase in calculation power since more signals are received per second from each of the plurality of radar transceivers 406a-406f. In addition, when multiple radar transceivers are concurrently transmitting signals the level of interference at the associated receivers also increases, reducing the accuracy of the detection process. Thus, in at least some implementations a time division access may be applied to the plurality of radar transceivers 406a-406f such that only some of the plurality of radar transceivers 406a-406f are transmitting and/or receiving signals at any one time. Thus, the plurality of radar transceivers 406a-406f are grouped into pairs of radar transceivers (e.g., 3 pairs of radar transceivers) and each of the pairs of radar transceivers is scheduled to transmit radar signals during a corresponding time slot of a plurality of time slots and also to receive the radar signals during the corresponding time slot. This time division and scheduling of transmissions from groups of the radar transceivers 406a-406f has the dual effect of reducing interference at the receiver 504, since fewer transceivers are transmitting at any one time, and reducing the calculation burden or requirement of the system while simultaneously allowing for increased frame rates for the transmitter 502 active during the corresponding time slot.

Figure 6:
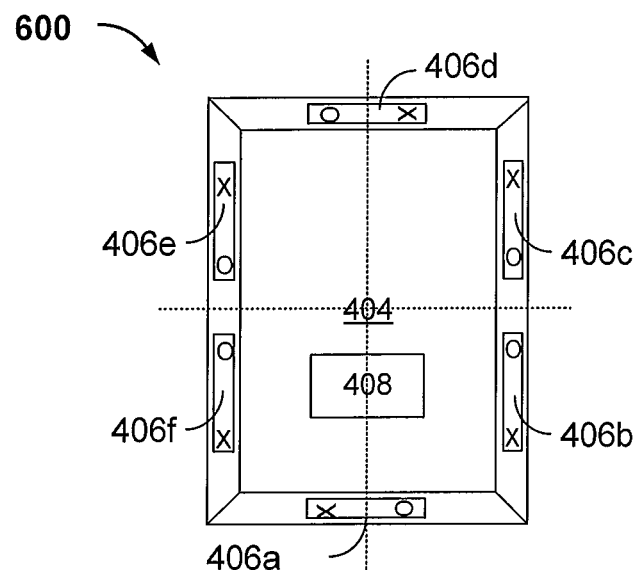
FIG. 6 is a top view of the living or moving object detection system of FIG. 4.

FIG. 6 is a top view 600 of the living or moving object detection system of FIG. 4. The detection system shows the processor 408 and each of the plurality of radar transceivers 406a-406f. Each of the plurality of radar transceivers 406a-406f may be grouped into one of a plurality of pairs of radar transceivers. In FIG. 6, the radar transceiver 406a and the radar transceiver 406c may comprise a first pair, the radar transceiver 406b and the radar transceiver 406e may comprise a second pair, and the radar transceiver 406d and the radar transceiver 406f may comprise a third pair. Thus, the radar transceivers 406a and 406c may transmit radar signals and receive the radar signals during a first time slot 702 (see FIG. 7), the radar transceiver 406b and the radar transceiver 406e may transmit radar signals and receive the radar signals during a second time slot 704 (see FIG. 7), and the radar transceiver 406d and the radar transceiver 406f may transmit radar signals and receive the radar signals during a third time slot 706 (see FIG. 7). The first time slot 702, the second time slot 704, and the third time slot 706 may repeat indefinitely or periodically.

As shown in FIG. 6, the orientation of the transmit and receive antennas (denoted by "X" and "O," respectively) in each of the plurality of radar transceivers 406a-406f may be based at least in part on how the plurality of radar transceivers 406a-406f are paired. For example, as previously described in connection with FIG. 5, the transmitter 502 and the receiver 504 of a radar transceiver 406a-406f may be disposed on opposite sides (e.g., left versus right side, rather than front versus back side) of the radar transceiver 406a-406f. The transmitters 502 may be located on their respective radar transceivers 406a-406f such that, for each radar transceiver in a pair of radar transceivers, the transmitter 502 of one of the radar transceivers 406a in the pair is separated by as great a distance as possible from the receiver 504 of the other of the radar transceivers 406c in the pair, given particular transceiver alignment restrictions. Thus, for each of the pairs of radar transceivers, a first orientation of a first transmitter 502 and a first receiver 504 of a first radar transceiver 406a is based on a second orientation of a second transmitter 502 and a second receiver 504 of a second radar transceiver 406c. Moreover, for each of the pairs of radar transceivers, a first transmitter 502 of a first radar transceiver 406a is separated from a receiver 504 of a second radar transceiver 406c by a greater distance than is a second transmitter 502 of the second radar transceiver 406c. In this way, although the locations of each of the radar transceivers 406a-406f may be symmetric about longitudinal and lateral axes of the base pad (see the dotted lines of FIG. 4), the transmitter 502 and the receiver 504 within a first radar transceiver 406a in a pair are disposed asymmetrically with respect to the transmitter 502 and the receiver 504 within a second radar transceiver 406c in the pair. This maximizes the detection volume of the detection system by ensuring a greatest distance between transmitters 502 and the receivers 504 of the radar transceivers 406a and 406c in a pair, for example.

Figure 7:
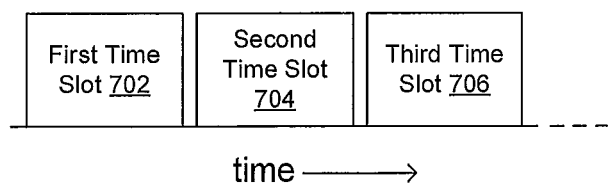
FIG. 7 is a timing diagram illustrating the use of predefined time slots during which corresponding pairs of radar transceivers are configured to transmit and receive, in accordance with some implementations.

FIG. 7 is a timing diagram 700 illustrating the use of the corresponding time slots 702, 704, 706 during which corresponding pairs of radar transceivers are configured to transmit and receive, in accordance with some implementations. The timing diagram 700 shows the corresponding time slots 702, 704 and 706. As previously described in connection with FIG. 6, as an example, the radar transceiver 406a and the radar transceiver 406c may comprise a first pair, the radar transceiver 406b and the radar transceiver 406e may comprise a second pair, and the radar transceiver 406d and the radar transceiver 406f may comprise a third pair. The radar transceiver 406a and the radar transceiver 406c may transmit radar signals and receive the radar signals during the first time slot 702, the radar transceiver 406b and the radar transceiver 406e may transmit radar signals and receive the radar during the second time slot 704, and the radar transceiver 406d and the radar transceiver 406f may transmit radar signals and receive the radar signals during the third time slot 706. The first, second and third time slots 702, 704, 706 may repeat indefinitely or periodically. In order to accomplish this, in some implementations, the processor 408 may be further configured to disable a transmitting capability of each of the pairs of radar transceivers 406a-406f outside of the corresponding time slot 702, 704, 706. Similarly, the processor 408 may be further configured to disable a receiving capability of each of the pairs of radar transceivers 406a-406f outside of the corresponding time slot 702, 704, 706.

Figure 8:
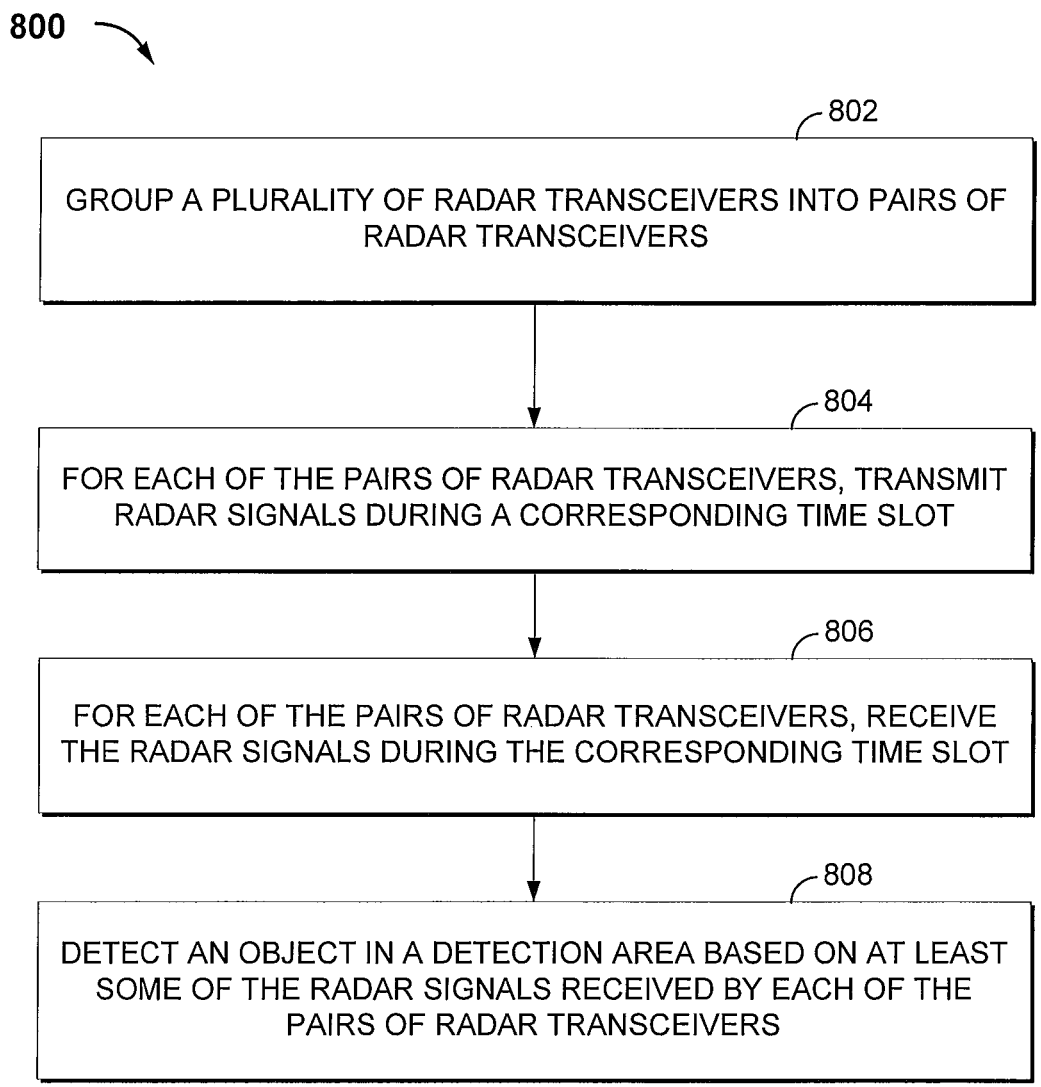
FIG. 8 is a flowchart depicting a method for detecting objects in a detection area near a wireless power transfer system, in accordance with some implementations.

FIG. 8 is a flowchart 800 depicting a method for detecting an object in a detection area near a wireless power transfer system, in accordance with some implementations. The method of flowchart 800 is described herein with reference to processor 408 and the plurality of radar transceivers 406a-406f as previously described in connection with FIGS. 4-6. In some implementations, the plurality of radar transceivers 406a-406f may also be known as, or comprise at least a portion of, a plurality of "means for transmitting and receiving radar signals," "first means for transmitting and receiving radar signals," and/or "second means for transmitting and receiving radar signals." Although the method of flowchart 800 is described herein with reference to a particular order, in various implementations, blocks herein may be performed in a different order, or omitted, and additional blocks may be added.

The flowchart 800 may start with block 802, which includes grouping a plurality of radar transceivers into pairs of radar transceivers. For example, as previously described in connection with FIG. 6, the processor 408 may be configured to group the plurality of radar transceivers 406a-406f into pairs of radar transceivers. This may be accomplished constructively in that the processor 408, for example, may be configured or programmed to enable, disable, operate, send signals to, and/or receive signals from each of the 3 pairs of radar transceivers during time slots corresponding to the respective pairs. In some implementations, the processor 408 may also be known as, or comprise at least a portion of "means for grouping the plurality of means for transmitting and receiving radar signals into pairs."

The flowchart 800 may then advance to block 804, which includes for each of the pairs of radar transceivers, transmitting radar signals during a corresponding time slot. For example, as previously described in connection with FIG. 6, the processor 408 may be configured to instruct each of the pairs of radar transceivers 406a-406f to transmit radar signals during a corresponding time slot of a plurality of time slots. At least one of the transmitter 502 of the radar transceiver 406a and the transmitter 502 of the radar transceiver 406c may transmit radar signals during the corresponding time slot (e.g., the first time slot 702). Likewise, at least one of the transmitter 502 of the radar transceiver 406b and the transmitter 502 of the radar transceiver 406e may transmit radar signals during the corresponding time slot (e.g., the second time slot 704). And at least one of the transmitter 502 of the radar transceiver 406d and the transmitter 502 of the radar transceiver 406f may transmit a radar signal during the corresponding time slot (e.g., the third time slot 706). In some implementations, the processor 408 may also be known as, or comprise at least a portion of "means for instructing each of the pairs to transmit radar signals during a corresponding time slot of a plurality of time slots," and/or "means for disabling a transmitting capability of each of the pairs of radar transceivers outside of the corresponding time slot."

The flowchart 800 may then advance to block 806, which includes for each of the pairs of radar transceivers, receiving the radar signals during the corresponding time slot. For example, as previously described in connection with FIG. 6, the processor 408 may be configured to instruct each of the pairs of radar transceivers 406a-406f to receive the radar signals during the corresponding time slot of the plurality of time slots. At least one of the receiver 504 of the radar transceiver 406a and the receiver 504 of the radar transceiver 406c may receive the radar signal(s) transmitted during the corresponding time slot (e.g., first time slot 702). Likewise, at least one of the receiver 504 of the radar transceiver 406b and the receiver 504 of the radar transceiver 406e may receive the radar signal(s) transmitted during the corresponding time slot (e.g., the second time slot 704). And at least one of the receiver 504 of the radar transceiver 406d and the receiver 504 of the radar transceiver 406f may receive the radar signal(s) transmitted during the corresponding time slot (e.g., the third time slot 706). In some implementations, the processor 408 may also be known as, or comprise at least a portion of "means for instructing each of the pairs to receive the radar signals during the corresponding time slot of the plurality of time slots," and/or "means for disabling a receiving capability of each of the pairs of radar transceivers outside of the corresponding time slot."

The flowchart 800 may then advance to block 808, which includes detecting an object in a detection area based on at least some of the radar signals received by each of the pairs of radar transceivers. For example, as previously described, the processor 408 of FIG. 4 may be configured to detect the object in the detection area based on at least some of the radar signals received by each of the pairs of radar transceivers satisfying detection criteria. In some implementations, the processor 408 may also be known as, or comprise at least a portion of means for detecting the object in the detection area based on at least some of the radar signals received by each of the pairs.

The various operations of methods described above may be performed by any suitable means capable of performing the operations, such as various hardware and/or software component(s), circuits, and/or transceiver(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, transceivers, circuits, and algorithm steps described in connection with the implementations disclosed herein may be implemented as electronic hardware, computer software, or combinations of both. To clearly illustrate this interchangeability of hardware and software, various illustrative components, blocks, transceivers, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the present application.

The various illustrative blocks, transceivers, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software transceiver executed by a processor, or in a combination of the two. If implemented in software, the functions may be stored on or transmitted over as one or more instructions or code on a tangible, non-transitory, computer-readable medium. A software transceiver may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features have been described herein. It is to be understood that not necessarily all such advantages may be achieved in accordance with any particular implementation. Thus, one or more implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the present application. Thus, the present application is not intended to be limited to the implementations shown herein but is to be accorded the widest scope consistent with the principles and novel features disclosed herein.

What is claimed is:

1. An apparatus for detecting an object in a detection area of a wireless power transfer system having a base pad with first and second sides and configured to provide an amount of power to wirelessly charge a chargeable energy storage device, the apparatus comprising:
   a plurality of radar transceivers, each of the plurality of radar transceivers comprising a transmit antenna and a receive antenna; and
   a processor configured to:
      group the plurality of radar transceivers into pairs of radar transceivers,
      instruct each of the pairs of radar transceivers to transmit radar signals during a corresponding time slot of a plurality of time slots, wherein for each pair of radar transceivers, a first radar transceiver is integrated with the first side of the base pad and a second radar transceiver is integrated with the second side of the base pad and wherein the first side is opposite the second side on the base pad,
      instruct each of the pairs of radar transceivers to receive the radar signals during the corresponding time slot of the plurality of time slots,
      detect the object in the detection area based on at least some of the radar signals received by the pairs of radar transceivers,
      reduce the amount of power provided by the wireless power transfer system in response to detecting the object in the detection area; and
      disable a receiving capability of each of the pairs of radar transceivers outside of the corresponding time slot.

2. The apparatus of claim 1, wherein each of the pairs of radar transceivers comprises a transmitter.

3. The apparatus of claim 1, wherein each of the pairs of radar transceivers comprises a receiver.

4. The apparatus of claim 1, wherein, for each of the pairs of radar transceivers, a first orientation of a first transmitter and a first receiver of the first radar transceiver is based on a second orientation of a second transmitter and a second receiver of the second radar transceiver.

5. The apparatus of claim 1, wherein, for each of the pairs of radar transceivers, a first transmitter of the first radar transceiver is separated from a receiver of the second radar transceiver by a greater distance than is a second transmitter of the second radar transceiver.

6. The apparatus of claim 1, wherein the processor is further configured to disable a transmitting capability of each of the pairs of radar transceivers outside of the corresponding time slot.

7. A method for detecting an object in a detection area of a wireless power transfer system having a base pad with first and second sides and configured to provide an amount of power to wirelessly charge a chargeable energy storage device, the method comprising:
   grouping, by a processor, a plurality of radar transceivers into pairs of radar transceivers, wherein each of the plurality of radar transceivers comprises a transmit antenna and a receive antenna and wherein for each pair of radar transceivers, a first radar transceiver is integrated with the first side of the base pad and a second radar transceiver is integrated with the second side of the base pad, the first side being opposite the second side on the base pad;
   for each of the pairs of radar transceivers:
      transmitting radar signals during a corresponding time slot, and
      receiving the radar signals during the corresponding time slot;
   detecting, by the processor, the object in the detection area based on at least some of the radar signals received by the pairs of radar transceivers;
   reducing the amount of power provided by the wireless power transfer system in response to detecting the object in the detection area; and
   disabling a receiving capability of each of the pairs of radar transceivers outside of the corresponding time slot.

8. The method of claim 7, wherein, for each of the pairs of radar transceivers, the radar signals are transmitted by a transmitter during the corresponding time slot.

9. The method of claim 7, wherein, for each of the pairs of radar transceivers, the radar signals are received by a receiver during the corresponding time slot.

10. The method of claim 7, wherein, for each of the pairs of radar transceivers, a first orientation of a first transmitter and a first receiver of the first radar transceiver is based on a second orientation of a second transmitter and a second receiver of the second radar transceiver.

11. The method of claim 7, wherein, for each of the pairs of radar transceivers, a first transmitter of the first radar transceiver is separated from a receiver of the second radar transceiver by a greater distance than is a second transmitter of the second radar transceiver.

12. The method of claim 7, further comprising disabling a transmitting capability of each of the pairs of radar transceivers outside of the corresponding time slot.

13. A non-transitory, computer-readable medium comprising code that, when executed, causes an apparatus for detecting an object in a detection area of a wireless power transfer system having a base pad with first and second sides and configured to provide an amount of power to wirelessly charge a chargeable energy storage device to:
- group a plurality of radar transceivers into pairs of radar transceivers, wherein each of the plurality of radar transceivers comprises a transmit antenna and a receive antenna and wherein for each pair of radar transceivers, a first radar transceiver is integrated with the first side of the base pad and a second radar transceiver is integrated with the second side of the base pad, the first side being opposite the second side on the base pad;
- for each of the pairs of radar transceivers:
    - transmit radar signals during a corresponding time slot, and
    - receive the radar signals during the corresponding time slot;
- detect the object in the detection area based on at least some of the radar signals received by each of the pairs of radar transceivers;
- reduce the amount of power provided by the wireless power transfer system in response to detecting the object in the detection area; and
- disable a receiving capability of each of the pairs of radar transceivers outside of the corresponding time slot.

14. The medium of claim 13, wherein, for each of the pairs of radar transceivers, the radar signals are transmitted by a transmitter during the corresponding time slot.

15. The medium of claim 13, wherein, for each of the pairs of radar transceivers, the radar signals are received by a receiver during the corresponding time slot.

16. The medium of claim 13, wherein, for each of the pairs of radar transceivers, a first orientation of a first transmitter and a first receiver of the first radar transceiver is based on a second orientation of a second transmitter and a second receiver of the second radar transceiver.

17. The medium of claim 13, wherein, for each of the pairs of radar transceivers, a first transmitter of the first radar transceiver is separated from a receiver of the second radar transceiver by a greater distance than is a second transmitter of the second radar transceiver.

18. The medium of claim 13, wherein the code, when executed, further causes the apparatus to disable a transmitting capability of each of the pairs of radar transceivers outside of the corresponding time slot.

19. An apparatus for detecting an object in a detection area of a wireless power transfer system having a base pad with first and second sides and configured to provide an amount of power to wirelessly charge a chargeable energy storage device, the apparatus comprising:
- a plurality of means for transmitting and receiving radar signals, each of the plurality of means for transmitting and receiving radar signals comprising a means for transmitting and a means for receiving;
- means for grouping the plurality of means for transmitting and receiving radar signals into pairs,
- means for instructing each of the pairs to transmit radar signals during a corresponding time slot of a plurality of time slots, wherein for each pair of means for transmitting and receiving radar signals, a first means for transmitting and receiving radar signals is integrated with the first side of the base pad and a second means for transmitting and receiving radar signals is integrated with the second side of the base pad and wherein the first side is opposite the second side on the base pad;
- means for instructing each of the pairs to receive the radar signals during the corresponding time slot of the plurality of time slots;
- means for detecting the object in the detection area based on at least some of the radar signals received by each of the pairs;
- means for reducing the amount of power provided by the wireless power transfer system in response to detecting the object in the detection area; and
- means for disabling a receiving capability of each of the pairs outside of the corresponding time slot.

20. The apparatus of claim 19, wherein the plurality of means for transmitting and receiving radar signals comprises a transmitter.

21. The apparatus of claim 19, wherein the plurality of means for transmitting and receiving radar signals comprises a receiver.

22. The apparatus of claim 19, wherein, for each of the pairs, a first transmitter of the first means for transmitting and receiving radar signals is separated from a receiver of the second means for transmitting and receiving radar signals by a greater distance than is a second transmitter of the second means for transmitting and receiving radar signals.

23. The apparatus of claim 19, further comprising means for disabling a transmitting capability of each of the pairs outside of the corresponding time slot.

* * * * *